United States Patent
Day, III et al.

(10) Patent No.: US 6,185,580 B1
(45) Date of Patent: Feb. 6, 2001

(54) PHYSICAL INFORMATION AND EXTENSIONS FILE AND FILE SYSTEM TRANSLATOR

(75) Inventors: Kenneth Fairclough Day, III; Douglas William Dewey, both of Tucson, AZ (US); David Allan Pease, Redwood Estates, CA (US)

(73) Assignee: International Business Machines Corporation, Armonk, NY (US)

(*) Notice: Under 35 U.S.C. 154(b), the term of this patent shall be extended for 0 days.

(21) Appl. No.: 09/103,697

(22) Filed: Jun. 24, 1998

(51) Int. Cl.[7] .................................................. G06F 17/30
(52) U.S. Cl. .............................. 707/205; 707/1; 707/4; 707/204; 345/326
(58) Field of Search .................................. 707/204, 205, 707/1, 4; 345/326

(56) References Cited

U.S. PATENT DOCUMENTS

| | | | |
|---|---|---|---|
| 4,956,809 | 9/1990 | George et al. ........................ | 707/101 |
| 5,088,031 | * 2/1992 | Takasaki et al. ..................... | 395/400 |
| 5,129,088 | * 7/1992 | Auslander et al. ................... | 395/700 |
| 5,506,692 | 4/1996 | Murata ................................ | 358/442 |
| 5,546,558 | * 8/1996 | Jacobson et al. .................... | 395/441 |
| 5,564,051 | 10/1996 | Halliwell et al. .................... | 707/200 |
| 5,572,711 | 11/1996 | Hirsch et al. ......................... | 703/26 |
| 5,682,507 | 10/1997 | Phillips et al. ...................... | 395/850 |
| 5,953,522 | * 9/1999 | Fox et al. ............................ | 395/681 |

* cited by examiner

Primary Examiner—John Breene
Assistant Examiner—Cheryl Lewis
(74) Attorney, Agent, or Firm—Altera Law Group, LLC

(57) ABSTRACT

A file translation system and a physical information and extensions file for an intermediary controller is disclosed. The file translation system that allow a host computer to directly access data from a different host type without moving the actual data. The physical information and extension file provides information concerning the location of data and the file system the host is viewing. The intermediary controller is disposed between a legacy disk controller for an originating host of a first type and an open system host. The intermediary controller emulates a virtual storage device using a virtual device file system, wherein the virtual device file system mapping data stored in a storage device by the originating host to objects in a root directory in the virtual device file system. The physical information and extension file comprising controller information for identifying the intermediary controller and logical device information, as well as any other information needed by an administrator or service technician.

28 Claims, 5 Drawing Sheets

PHYSICAL INFORMATION AND EXTENSIONS FILE AND FILE SYSTEM TRANSLATOR

BACKGROUND OF THE INVENTION

1. Field of the Invention

This invention relates in general to a data storage systems, and more particularly to physical information and extensions file and a file system translator.

2. Description of Related Art

Computing systems frequently are provided with storage subsystems having multiple storage devices connected to the computing system central processor through a device controller. For example, some computing systems include a plurality of disk arrange into a disk array with parity and sparing. Parity refers to organizing data into parity groups such that each modification of disk data that involves a relatively small write operation requires a read old data, read old parity, write new data, write new parity sequence of operations often referred to as a read-modified-write sequence. Sparing refers to providing spare data blocks to be used in the event of a disk failure.

A disk array controller is provided between the disk array and a computing system. As applications running in the computing system requests blocks of data from the disk array, the disk array controller checks whether the requested data block is located in a cache memory or whether the requested data block is on the disk array.

However, the disk controller often does not enable an open system host to access data on the disk array. Some storage device controller provide a Small Computer Standard Interface (SCSI) interface for allowing open system hosts to access data on the storage devices through the storage device controller thereby allowing an open system host to use an Enterprise System Connection (ESCON) storage device as one of it's own storage devices. Another method is to provide an intermediary disk controller between the open systems host and the legacy disk controller to allow new host types to use legacy disk controllers and storage devices. Thus, these new controllers act as an intermediary between hosts and controller units. These intermediary controllers also provide additional caching.

However, the intermediary controller does not have any provision for data sharing, wherein an originating host normally uses ESCON to access the legacy disk controller that knows where data is stored on the storage device. An open system host connected to an intermediary controller via a SCSI port uses a different operating system than the originating host and therefore the different operating systems refer to and organize the data differently. Accordingly, users or administrators of the open system hosts are not able to identify where data really are or what the data really are from viewing the file system of the intermediary controller.

It can be seen that there is a need for a file translation system that allow a host computer to directly access data from a different host type without moving the actual data.

It can also be seen that there is a need for an apparatus and method that provides information concerning the location of data and the file system the host is viewing.

SUMMARY OF THE INVENTION

To overcome the limitations in the prior art described above, and to overcome other limitations that will become apparent upon reading and understanding the present specification, the present invention discloses a file translation system and a physical information and extensions file for an intermediary controller.

The present invention solves the above-described problems by providing a file translation system that allow a host computer to directly access data from a different host type without moving the actual data and a physical information and extension file for providing information concerning the location of data and the file system the host is viewing.

A system in accordance with the principles of the present invention includes an intermediary controller disposed between a legacy disk controller for an originating host of a first type and an open system host, the intermediary controller emulating a virtual storage device using a virtual device file system, the virtual device file system mapping data stored in a storage device by the originating host to objects in a root directory in the virtual device file system.

Other embodiments of a system in accordance with the principles of the invention may include alternative or optional additional aspects. One such aspect of the present invention is that the virtual device file system comprises a transitional node, wherein the data and corresponding object are both mapped to the transitional node thereby linking the object in the root directory to corresponding data on the storage device.

Another aspect of the present invention is that the virtual device file system translates data known as objects in the storage device into a layout viewed by the open system host at data on the virtual storage device.

Another aspect of the present invention is that the virtual device file system further comprises metadata, the metadata providing physical information and extensions to a user of the open system host.

Another aspect of the present invention is that physical information and extension file is provided for enabling the identification of data locations and for indicating configuration data for an intermediary controller, the physical information and extension file comprising controller information for identifying the intermediary controller and logical device information.

Another aspect of the present invention is that the controller information comprises a model number for indicating the type of intermediary controller that is attached to the open system host, a web server name for the intermediary controller, a TCP/IP address, and the number of installed storage devices, the number of connections to legacy disk controllers and the number of connections to open system hosts Another aspect of the present invention is that the open system host is connected to the intermediary controller via a small computer standard interface connection and to the legacy disk controller via an enterprise system connection.

Another aspect of the present invention is that the logical device information further comprises small computer standard interface address information and enterprise system connection address information for every physical device connected to the intermediary controller.

Another aspect of the present invention is that the small computer standard interface address information comprises a small computer standard interface bus number, the small computer standard interface identification number, and the small computer standard interface logical unit number.

Another aspect of the present invention is that the enterprise system connection address information comprises the volume serial name, an indication of how many paths with different connections through the enterprise system connection can be connected, the control unit image that is used to access the device, the status of the device, the number of paths online, and message statistics including a number of blocks that may be read and written.

Another aspect of the present invention is that the physical information and extensions file further comprises a total number of devices connected to the intermediary controller, a total number of intermediary controllers, available cache memory for the intermediary controller, and performance statistics.

Another aspect of the present invention is that the physical information and extensions file further comprises fields for user defined comments strings to indicate a physical location for the intermediary controller.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a file translation system that allow a host computer to directly access data from a different host type without moving the actual data and a physical information and extension file for providing information concerning the location of data and the file system the host is viewing.

Figure 1:
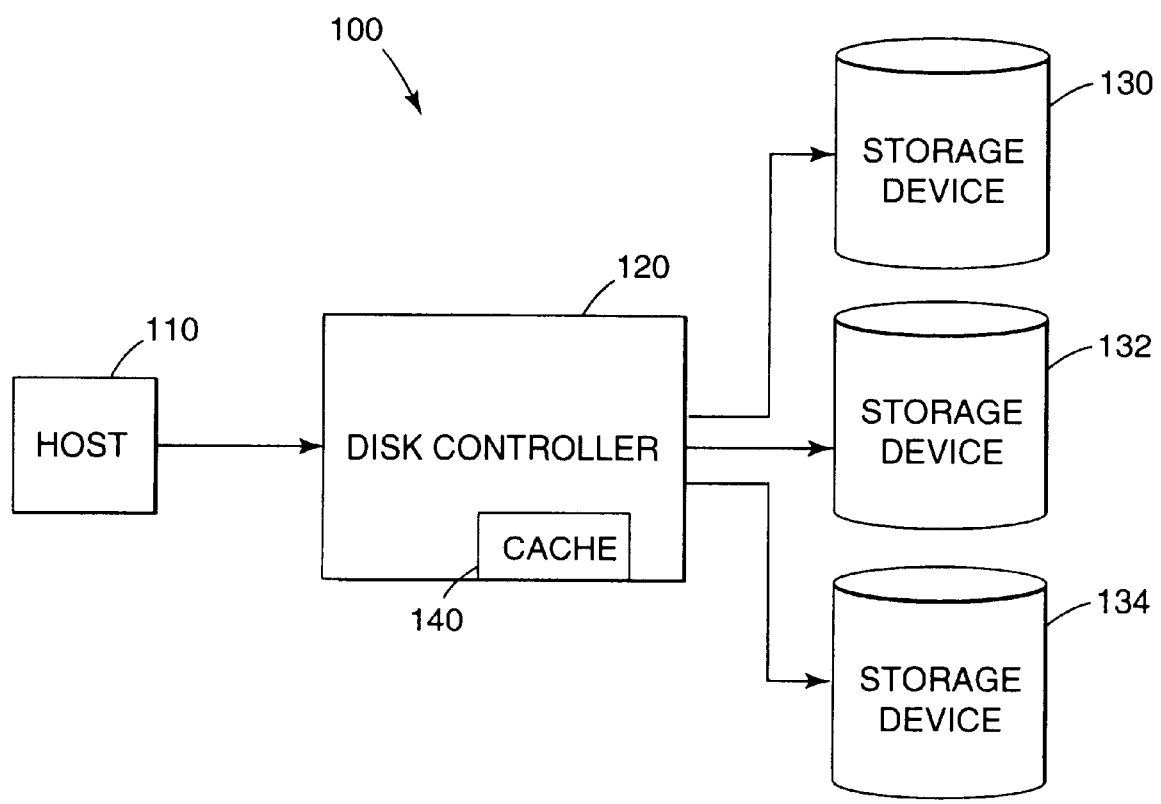
FIG. 1 illustrates a conventional storage system.

FIG. 1 illustrates a conventional storage system 100. In FIG. 1, a host 110 is coupled to a disk controller 120. The disk controller 120 receives data requests from the host 110 and accesses direct storage devices (DASD) 130, 132, 134. DASDs are one type of auxiliary storage device. In a DASD, access time to data is independent of the location of the data and the storage device. Currently, disk drive units are the most common type of DASD. A disk drive unit records data on a rotatable disk. The write and read transducers are moved readily inward and outward relative to the disk and the disk is rotated to bring any location of the disk and appropriate transducer into proximity with one another. A track is a 360° rotation for a given disk. A cylinder is a vertical band of tracks and there are typically many tracks within a cylinder.

The disk controller 120 includes a cache or memory 140 wherein data may be immediately accessed by the host 110. This is in contrast to accessing data in the DASD 130, 132, 134, which requires alignment of the transducer and a data block stored in the DASD 130, 132, 134.

Figure 2:
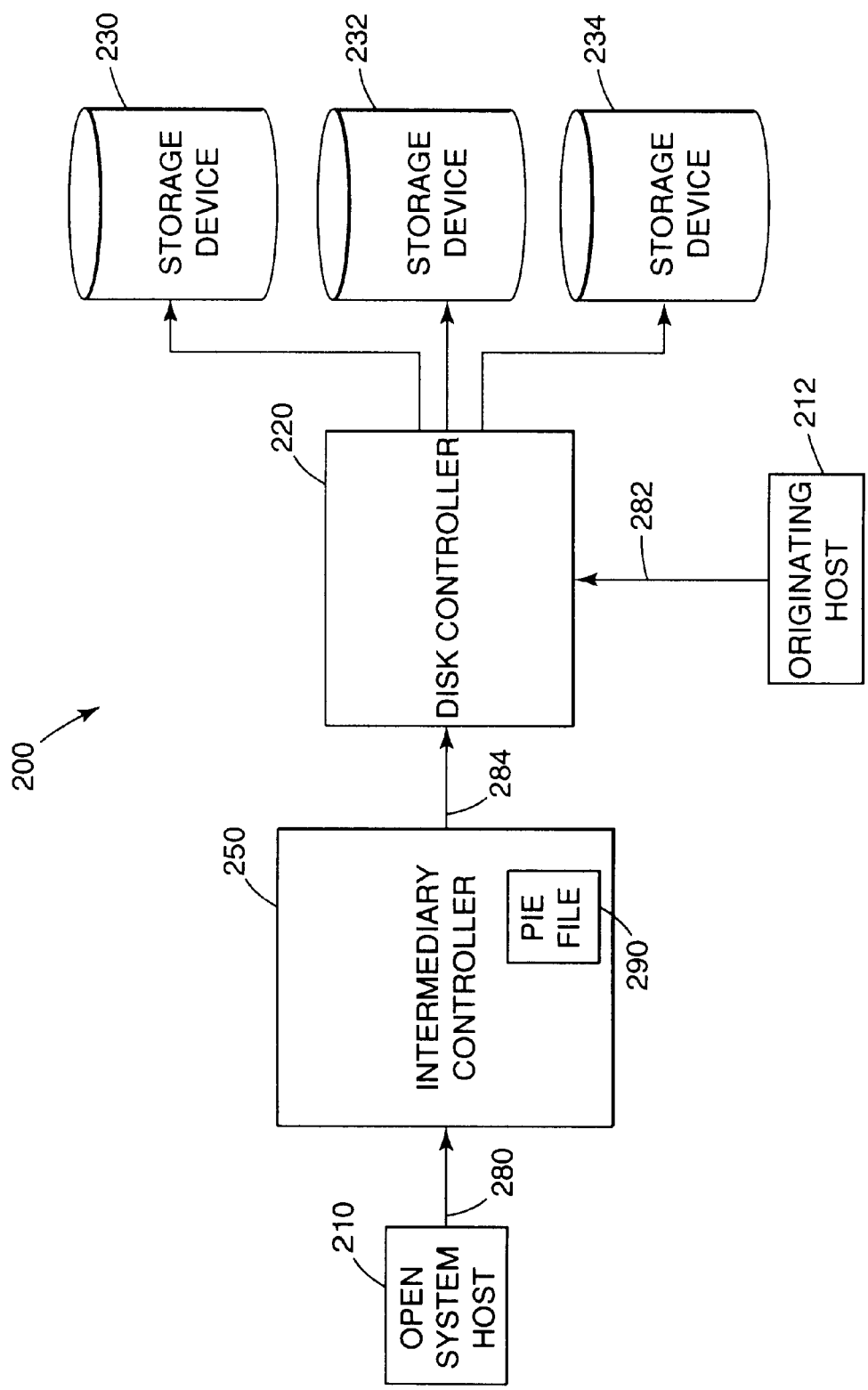
FIG. 2 illustrates a storage system according to the present invention.

FIG. 2 illustrates a storage system 200 according to the present invention. In FIG. 2, an open system host 210 is able to retrieve data from direct access storage devices (DASD) 230, 232, 234. The data on direct access storage devices (DASD) 230, 232, 234 is from originating host 212. Originating host is typically connected to the legacy disk controller 220 via an Enterprise System Connection (ESCON) 282. An intermediary controller 250 is also connected to the legacy disk controller 220 via an ESCON connection 284. The intermediary controller 250 provides a means whereby the open system host 210 can access data on storage devices 230, 232, 234 by controlling legacy disk controller 220. The intermediary controller 250 includes a physical information and extension (PIE) file 290 which will be described in detail below with reference to FIG. 6.

Figure 3:
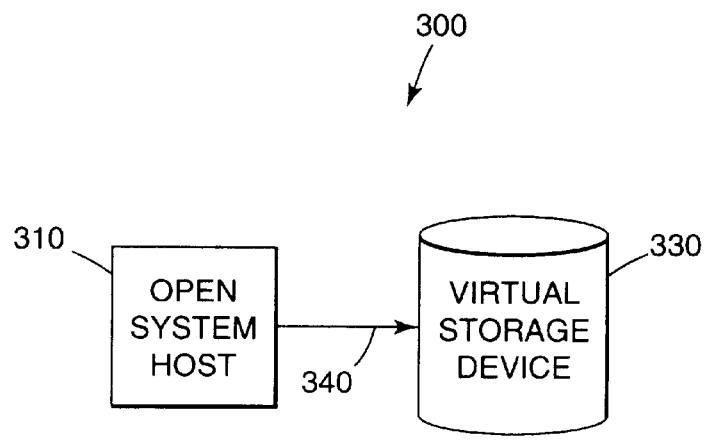
FIG. 3 illustrates the system block diagram for the open system host point of view.

FIG. 3 illustrates the system block diagram for the open system host point of view 300. From the point of view of the open system host 310, only a virtual disk 320 is seen. The virtual disk 320 appears to the open system host as a normal SCSI hard drive when actually the open system host 310 is really connected to the intermediary controller 250 illustrated in FIG. 2 which is reading, writing and manipulating the data on the DASD drives 230, 232, 234.

Referring again to FIG. 2, the originating host 212 determines what the data is and determines where the data is to be physically located on the DASD drives 230, 232, 234. The intermediary controller 250 determines for the open system host 210 where that data appears to be on the virtual device. Thus, the "what" of the data and the physical "where" is set by the originating host 212, but the "virtual where" is set by the intermediary controller 250. Thus, the intermediary controller 250 provides file system translation which allows the open system host 210 to access data of the originating host 212 without physically moving the data to a new storage device.

Figure 4:
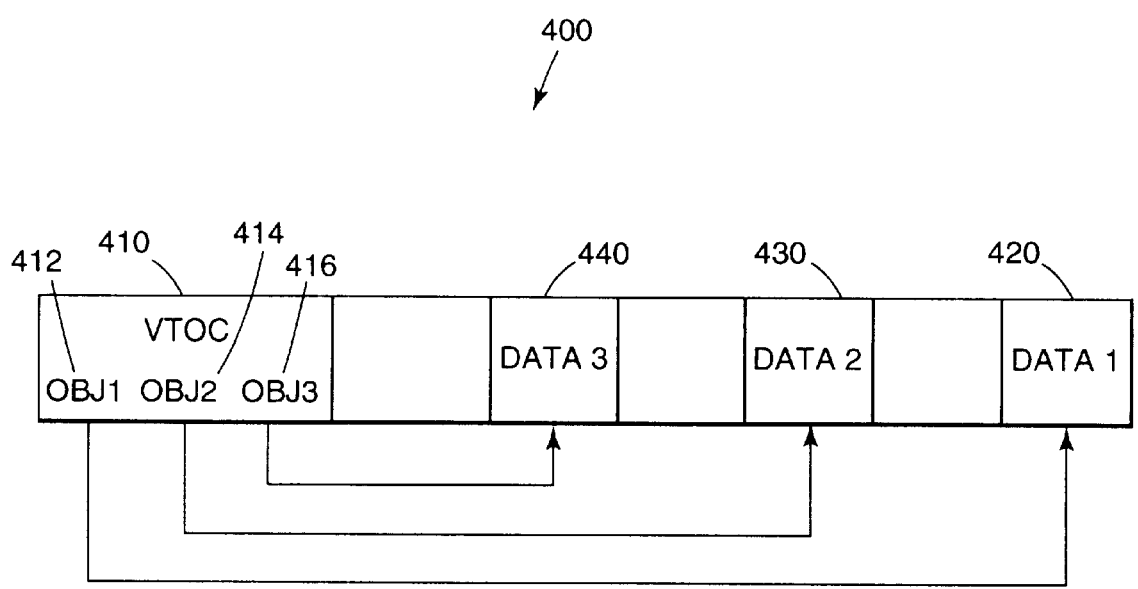
FIG. 4 illustrates the files system for the originating host.

FIG. 4 illustrates the files system 400 for the originating host. In FIG. 4, the file system 400 for the originating host has a single, large collection 410 that has three objects 412, 414, 416. Each of the objects 412, 414, 416 point to the data 420, 430, 440 associated with it.

Figure 5:
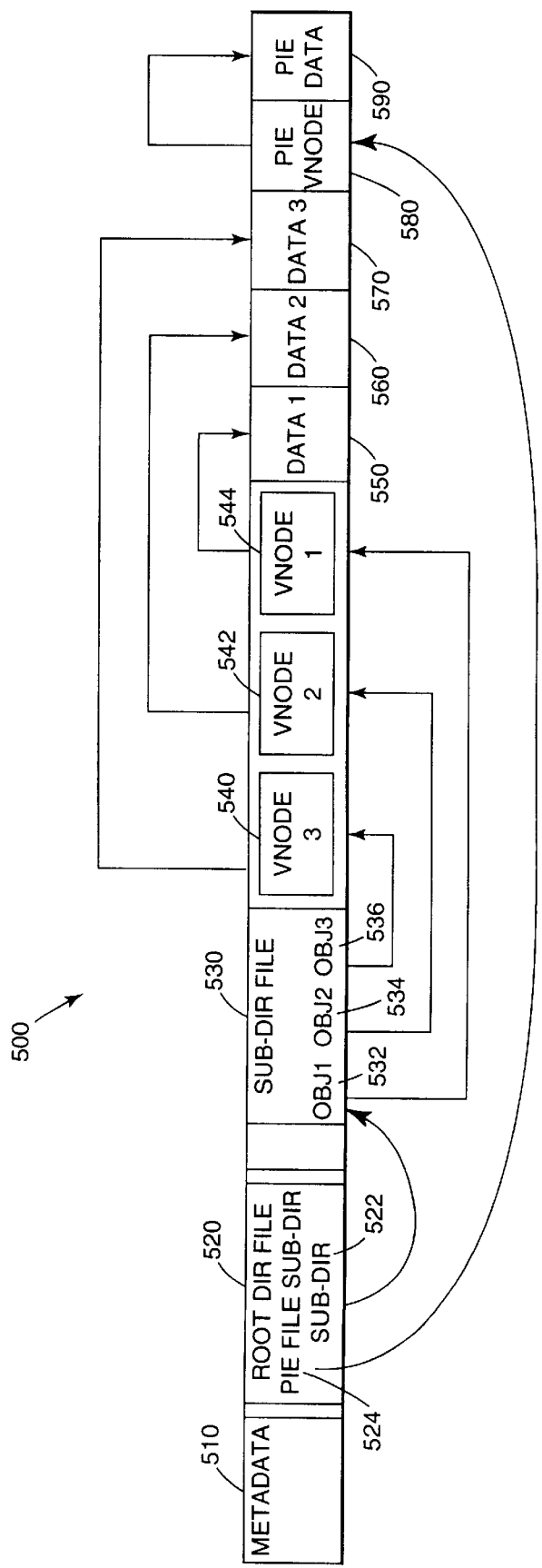
FIG. 5 illustrates a virtual device file system for translating the physical location of data on the disks into a layout seen by the open system host.

FIG. 5 illustrates a virtual device file system 500 for translating the physical location of data on the disks into a layout seen by the open system host. In FIG. 5, the virtual device file system 500 includes metadata 510, e.g., the PIE file, and a root directory file 520 having an entry for a sub-directory 522 referred to as sub-dir and a PIE file sub-directory 524 referred to as a PIE file sub-dir. The sub-dir 522 in the root directory file 520 points to a sub-dir file 530 which includes a list of files in the disk drives. The files are illustrated as being object 1 532, object 2 534, and object 3 536. Each of the objects 532, 534, 536 point to corresponding virtual nodes (VNODEs or INODEs) 540, 542, 544. The INODEs 540, 542, 544 actually point to the location of the data 550, 560, 570 of the file. The PIE file sub-dir 524 in the root directory file 520 points to a PIE VNODE 580. The PIE VNODE 580 then points to the location of the PIE data 590.

The purpose of the virtual device file system 500 is to take actual byte streams or the data in it, in this case data 3 570, data 2 560, data 1 550, that is known to the originating host as object 1 532, object 2 534, object 3 536 in some collection and translate this into a layout corresponding to how the open system host looks at this data in the virtual device. Using the virtual device file system 500, the open system host can access data it thinks is coming from something it recognizes in a sub-directory with the file names object 1 532, file name object 2 534, and file name object 3 536.

Figure 6:
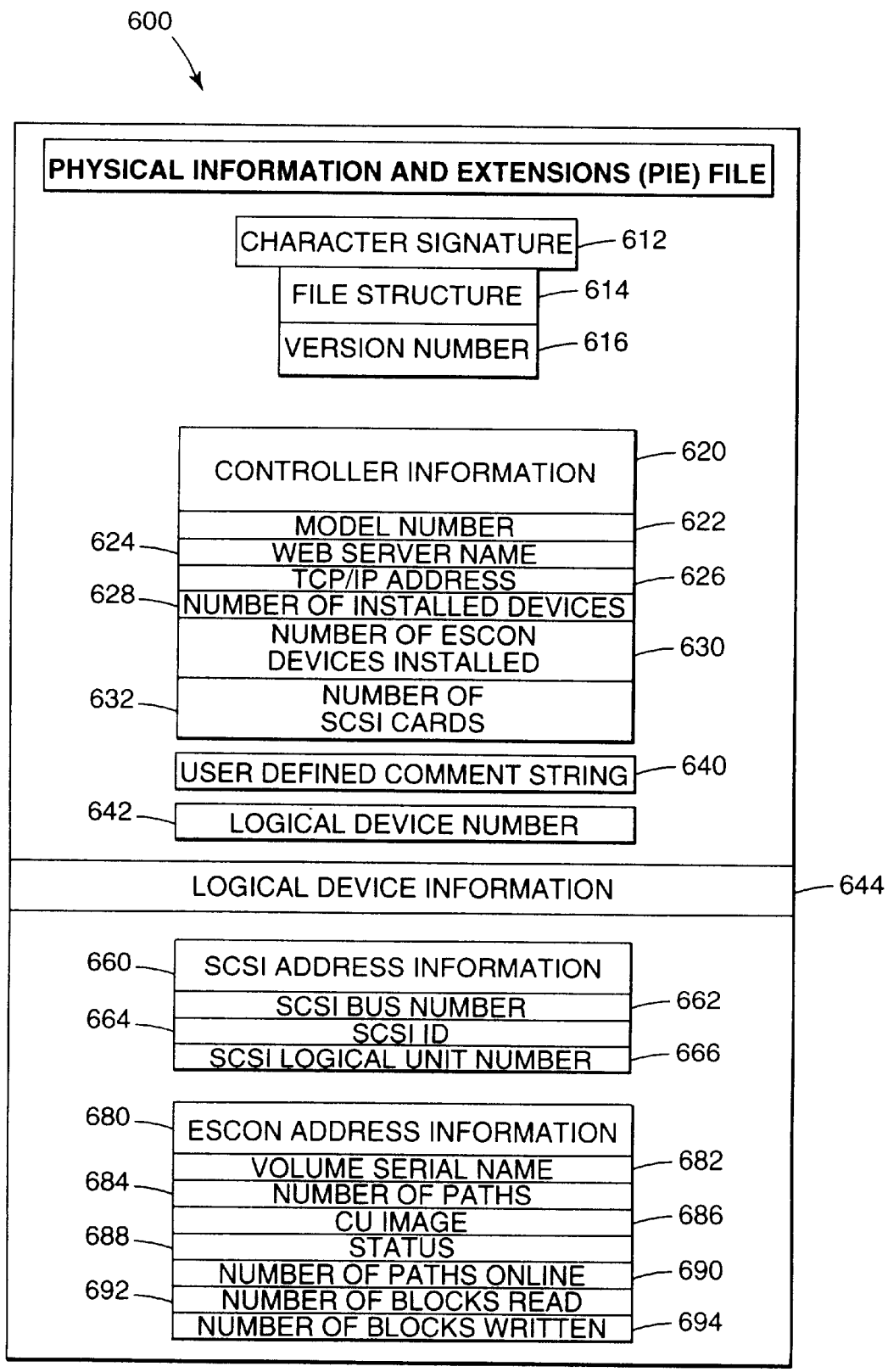
FIG. 6 illustrates a table representing information in one embodiment of a PIE file according to the present invention.

FIG. 6 illustrates a table representing information in one embodiment of a PIE file 600 according to the present invention. Those skilled in the art will recognize that the present invention is not meant to be limited to the specific information listed in the table 600 of FIG. 6. Rather, any metadata applicable to providing information about the system to enable the administrator to determine what is really occurring in the system and where data is located.

The PIE file 600 is data that really has nothing to do with the applications that run on the originating host or even on the open system host. The PEE file 600 is not truly user data, but rather includes system data made to appear as user data to make it easily accessible. The PIE file 600 may include any information about the physical layout. Since the intermediary controller and the file translation functions cause the open system host to think that there is just one large hard disk, or alternatively, a bunch of hard disk attached thereto. The PIE file 600 provides information to an administrator to enable the determination of what is really occurring in the system and where the data is located. For example, without the PIE file 600, the open system host may indicate the data is on disk 21, but in actuality, the intermediary controller is mapping the data on disk 10 to appear to be on disk 21. The PIE file 600 provides information about the system to enable the administrator to gather actual physical information concerning the system.

In FIG. 6, the PIE file 600 includes a character signature 612 for identifying the PIE file 600 with an intermediary controller, including the file structure 614 and version number 616. The PIE file version number identifies the version of the PIE file in the event changes need to be made after the product is shipped. The controller information 620 is the generic term for identifying information associated with the particular intermediary controller. The controller information 620 may includes a model number 622 for indicating the type of intermediary controller that is attached, a web server name 624 for the intermediary controller, a TCP/IP address 626, the number of installed devices 628, wherein the number of installed devices the intermediary controller is truly managing may differ from the number of installed devices which are viewable to this particular open system host (there might be other open system hosts attached in the setup), the number of installed ESCON cards 630 and the number of SCSI cards 632. While not shown in FIG. 6, the PIE file 600 may also include information regarding the total number of devices that are actually hooked to the intermediary controller, the total number of controllers, how much cache memory does this intermediary controller have, performance statistics, etc. Accordingly, there may be multiple open system hosts all dealing with one controller, or there may be multiple controllers and multiple hosts.

The PIE file 600 also includes generic fields for user defined comments strings 640 for indicating the physical location of the intermediary controller since the intermediary controller may be remotely located. A logical device number 642 identifies the particular intermediary controller within an intermediary controller system that the host is communicating with.

The PIE file 600 provides logical device information 644. The logical device information fields 644 are repeated for every physical device on the system. The logical device information 644 includes both SCSI address information 660 and ESCON address information 680. The SCSI address information 660 includes the SCSI bus number 662, the SCSI ID 664, and the SCSI logical unit number 666.

The ESCON address information 680 includes the ESCON volume serial name 682 which is likely to be different than what the open system volume label is for that device. Thus, the ESCON volume serial name 682 provides information on what the open system host calls the device and what the originating host calls the device.

The ESCON address information 680 also includes an indication of how many paths with different connections through ESCON can connect to this device 684, which control unit image 686 is used to access the device, the status of the device 688 (online/off-line), the number of paths online 690, and message statistics such as a number of blocks that may be read 692 and written 694.

In summary, the present invention provides a method for identifying data on a device in a first operating system and mapping the data over to a host in a second operating system, since the file system of the first operating system may be in different format than what the second operating system is using. In addition, a PIE file is provided to enable an administrator to identifying the location of data and identify the configuration of the intermediary controller system.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An intermediary controller disposed between a legacy disk controller for an originating host of a first type and an open system host, the intermediary controller emulating a virtual storage device using a virtual device file system, the virtual device file system performing file system translation by mapping data stored in a storage device by the originating host to objects in a root directory in the virtual device file system to allow the open system host to locate and view the data of the storage device.

2. The intermediary controller of claim 1 wherein the virtual device file system comprises a transitional node, wherein the data and corresponding object are both mapped to the transitional node thereby linking the object in the root directory to corresponding data on the storage device.

3. The intermediary controller of claim 1 wherein the virtual device file system translates data known as objects in the storage device into a layout viewed by the open system host at data on the virtual storage device.

4. The intermediary controller of claim 1 wherein the virtual device file system further comprises metadata, the metadata providing physical information and extensions to a user of the open system host.

5. The intermediary controller of claim 4 wherein the metadata comprises controller information for identifying the intermediary controller and logical device information.

6. The intermediary controller of claim 5 wherein the controller information comprises a model number for indicating the type of intermediary controller that is attached to the open system host, a web server name for the intermediary controller, a TCP/IP address, and the number of installed storage devices, the number of connections to legacy disk controllers and the number of connections to open system hosts.

7. The intermediary controller of claim 6 wherein the open system host is connected to the intermediary controller via a small computer standard interface connection and to the legacy disk controller via an enterprise system connection.

8. The intermediary controller of claim 7 wherein the logical device information further comprises small computer standard interface address information and enterprise system connection address information for every physical device connected to the intermediary controller.

9. The intermediary controller of claim 8 wherein the small computer standard interface address information comprises a small computer standard interface bus number, the small computer standard interface identification number, and the small computer standard interface logical unit number.

10. The intermediary controller of claim 9 wherein the enterprise system connection address information comprises the volume serial name, an indication of how many paths with different connections through the enterprise system connection can be connected, the control unit image that is used to access the device, the status of the device, the number of paths online, and message statistics including a number of blocks that may be read and written.

11. The intermediary controller of claim 5 wherein the metadata further comprises a total number of devices connected to the intermediary controller, a total number of intermediary controllers, available cache memory for the intermediary controller, and performance statistics.

12. The intermediary controller of claim 5 wherein the metadata further comprises fields for user defined comments strings to indicate a physical location for the intermediary controller.

13. A physical information and extension file disposed in an intermediary controller located between a legacy disk controller and an open system host, the physical information and extension file translating data locations in a plurality of storage devices to a format readable by the open system host and indicating configuration data for the intermediary controller, the physical information and extension file comprising controller information for identifying the intermediary controller and logical device information.

14. The physical information and extension file of claim 13 wherein the controller information comprises a model number for indicating the type of intermediary controller that is attached to the open system host, a web server name for the intermediary controller, a TCP/IP address, and the number of installed storage devices, the number of connections to legacy disk controllers and the number of connections to open system hosts.

15. The physical information and extension file of claim 14 wherein the open system host is connected to the intermediary controller via a small computer standard interface connection and to the legacy disk controller via an enterprise system connection.

16. The physical information and extension file of claim 15 wherein the logical device information further comprises small computer standard interface address information and enterprise system connection address information for every physical device connected to the intermediary controller.

17. The physical information and extension file of claim 16 wherein the small computer standard interface address information comprises a small computer standard interface bus number, the small computer standard interface identification number, and the small computer standard interface logical unit number.

18. The physical information and extension file of claim 17 wherein the enterprise system connection address information comprises the volume serial name, an indication of how many paths with different connections through the enterprise system connection can be connected, the control unit image that is used to access the device, the status of the device, the number of paths online, and message statistics including a number of blocks that may be read and written.

19. The physical information and extension file of claim 13 further comprises a total number of devices connected to the intermediary controller, a total number of intermediary controllers, available cache memory for the intermediary controller, and performance statistics.

20. The physical information and extension file of claim 13 further comprises fields for user defined comments strings to indicate a physical location for the intermediary controller.

21. A method of emulating a virtual disk by an intermediary disk controller disposed between an open system host and a legacy disk controller accessed by an originating host for storing data on legacy storage devices, comprising:

translating data locations for data stored on the legacy storage devices to a format readable by the open system host; and providing metadata corresponding the physical information associated with the intermediary controller, the legacy disk controller and the legacy storage devices.

22. The method of claim 21 wherein the translating further comprises mapping data stored in the storage devices by the originating host to objects in a root directory in a virtual device file system.

23. The method of claim 22 wherein the virtual device file system comprises a transitional node, wherein the mapping further comprises associating data and a corresponding object with a transitional node thereby linking the object seen by the open system host to corresponding data on the storage devices.

24. The method of claim 21 wherein the metadata further comprises physical information and extensions for identifying the location of data on the legacy storage devices and a configuration of the intermediary controller to a user of the open system host.

25. An article of manufacture for a intermediary controller, the article of manufacture comprising a computer readable medium having instructions for causing the intermediary controller disposed between an open system host and a legacy disk controller to emulate a virtual disk, the legacy disk controller being accessed by an originating host to store data on legacy storage devices, comprising:

translating data locations for data stored on legacy storage devices to a format readable by the open system host; and providing metadata corresponding the physical information associated with the intermediary controller, the legacy disk controller and the legacy storage devices.

26. The article of manufacture of claim 25 wherein the translating further comprises mapping data stored in the storage devices by the originating host to objects in a root directory in a virtual device file system.

27. The article of manufacture of claim 26 wherein the virtual device file system comprises a transitional node, wherein the mapping further comprises associating data and a corresponding object with a transitional node thereby linking the object seen by the open system host to corresponding data on the storage devices.

28. The article of manufacture of claim 25 wherein the metadata further comprises physical information and extensions for identifying the location of data on the legacy storage devices and a configuration of the intermediary controller to a user of the open system host.

* * * * *